United States Patent [19]

Maing et al.

[11] 4,133,900

[45] Jan. 9, 1979

[54] STABILIZATION OF ERYTHROSINE IN AQUEOUS ACIDIC FOOD SYSTEMS

[75] Inventors: Il-Young Maing, Tarrytown; Thomas H. Parliment; Robert J. Soukup, both of New City, all of N.Y.

[73] Assignee: General Foods Corporation

[21] Appl. No.: 828,571

[22] Filed: Aug. 29, 1977

[51] Int. Cl.² .......................... A23C 1/275; A23C 2/00
[52] U.S. Cl. ..................................... 426/540; 426/590
[58] Field of Search ................ 426/540, 250, 590, 268

[56] References Cited

U.S. PATENT DOCUMENTS

| | | | |
|---|---|---|---|
| 3,009,811 | 11/1961 | Raffensperger et al. | 426/590 |
| 3,328,173 | 6/1967 | Van Ness et al. | 426/590 |
| 3,387,983 | 6/1968 | Rast | 106/308 Q |
| 3,425,841 | 2/1969 | Handwerk et al. | 426/250 |
| 3,475,187 | 10/1969 | Kane | 106/22 |
| 3,511,667 | 5/1970 | Schramn | 426/250 |
| 3,968,263 | 7/1976 | Renssner | 426/250 |
| 3,975,547 | 8/1976 | D'Ercole | 426/106 |
| 4,001,448 | 1/1977 | Finuczne | 426/285 |
| 4,002,770 | 1/1977 | Waukier | 426/250 |

*Primary Examiner*—Raymond N. Jones
*Assistant Examiner*—Elizabeth A. Hatcher
*Attorney, Agent, or Firm*—Richard Kornutik

[57] ABSTRACT

This invention relates to a coloring agent which is soluble and stable in low pH aqueous food systems. The food colorant, Food, Drug and Cosmetic Red No. 3, which contains a carboxylic group, is predominantly in the unionized form below pH 4.5 and is, therefore, at a concentration required for red coloring virtually insoluble. Red No. 3 is rendered soluble by mixing it with water and a hydrophilic surfactant selected from the group consisting of polyoxyethylene (20) sorbitan monostearate, polyoxyethylene (20) sorbitan tristearate and polyoxyethylene (20) sorbitan monooleate and mixtures thereof. The resulting mixture is added directly to an aqueous foodstuff or after first fixing it on or in a carrier.

27 Claims, 2 Drawing Figures

STABILIZATION OF ERYTHROSINE IN AQUEOUS ACIDIC FOOD SYSTEMS

BACKGROUND OF THE INVENTION

The preservation, protection and maintenance of color in foods and beverages are frequently difficult. Natural pigments either originally contained in the food or added thereto may well deteriorate because of exposure to light, air or extremes of temperature or because they interact with constituents in the product. These changes may occur readily or over long periods of time, and may result in fading, darkening or change in hue, any of which can affect acceptability.

When foods do not contain natural or inherent color of sufficient quality or stability, the use of color additives serves several important functions. Added color makes food more visually appealing and helps emphasize or identify flavors normally associated with a particular food. Greater uniformity of appearance is obtained by adding color to correct natural variations resulting from storage, processing, packaging and distribution.

It is well-known that many of the synthetic colors, generally called FD&C colors, have broad utility in food products, including those prepared with low pH aqueous solutions. For example, U.S. Pat. No. 3,511,667 teaches that almost all of the FD&C colors are water soluble in their acid form and consequently in their acid form dissolve at a low pH in aqueous systems. As a notable exception, however, the reference states that FD&C Red No. 3 can normally be employed only in neutral and alkaline aqueous mediums in addition to its particular utility in fatty materials. Thus, this reference recognizes the difficulties art workers have encountered when attempting to formulate clear, acidic food products, much less clear aqueous acid beverages, employing FD&C Red No. 3 as a colorant.

Red No. 3, also known as erythrosine, is a xanthene-type synthetic coal tar derived synthetic color. Chemically, it can be defined as the disodium salt of tetraiodofluorescein. It is an extremely bright pink/red color, is insoluble in acids and exhibits a very strong fluorencence and strong staining properties. It has been used in aqueous food products, but has heretofore been generally restricted to systems with a pH of above about 4.5. The insolubility is probably due to the fact that it contains a carboxylic group which is predominantly in the un-ionized form below pH 4.5.

The problems associated with employing Red No. 3 in acid beverages were also recognized in U.S. Pat. No. 3,425,841. However, this patent does disclose that a small amount of Red No. 3 (approximately 8 parts per million) can be added to a cloudy pineapple/grapefruit juice blend with a pH as low as 3.1 to impart a pink tint to the juice.

Another prior art attempt to color food products with Red No. 3 includes jet milling the dye. In this manner a dispersion of FD&C Red No. 3 at low pH's may be improved by micro-pulverizing the dry color pieces in a unit such as a Micron-Master(™) Jet Pulverizer. These units operate by impacting one particle dirven at high velocity by jet of air or steam against other particles of the same material. Milling by such a process reduces the particle size of the colorant to the 1-10 micron range. The resultant product, while not soluble in water, is more dispersible than its un-milled counterpart. However, the stability of the so-called solution is relatively short. In the case of jet milled FD&C No. 3 placed in a beverage with a pH of less than 4.5, the color will precipitate within an hour.

Unlike FD&C No. 3, some natural, oil soluble colors such as turmeric, annatto and paprika are insensitive to pH and insoluble in water at any pH. Some of these oil based colors are, however, commercially available in water dispersible form. These colors are not soluble in water but form dispersions which, within a short period of time, typically less than 1 hour, will begin to precipitate. Oleoresin forms are available wherein the color is standardized or stabilized with polysorbate 80. Polysorbates generally are known for their use in foods as emulsifiers, solubilizing agents and dispersing agents. Specifically, they are used as emulsifiers in ice cream, frozen custard, ice milk, icings, fillings and toppings. They are used as solubilizing and dispersing agents in pickles, pickle products, fat soluble vitamin and vitamin/mineral preparations, and as dispersing agents in gelatin desserts and gelatin dessert mixes.

Other emulsifying agents or solvents such as propylene glycol, di-glycerides and various vegetable oils and fats are also compatible with natural oil based food colorants to render them oil dispersible. Two manufacturers who produce this class of color are McCormick & Company, Industrial Flavor Division, Hunt Valley, Maryland and Chr. Hansen's Laboratory, Milwaukee, Wisconsin. Liquid colors prepared in this manner are insensitive to pH since the entire composition is oil based and is, therefore, at best, only slightly soluble in water. This class of color is also available in dry form wherein the color is spray dried on a carrier, typically gum Arabic, along with a stabilizer such as polysorbate 80 to yield a dry, oil-dispersible, freeflowing product. Typical uses for turmeric are sausage cases, margarine, shortenings and other fatty foods. Paprika and annatto are used to color cheese and fatty foods. These oil-based colors, however, are unstable in aqueous systems and are not employed in water-based beverages or dry mixes which are reconstituted with water.

Similarly with these natural colors, the carotenoid dyes are insoluble in water and insensitive to pH, but additionally, they have only limited solubility in oils. German Pat. No. 2,411,529 relates to the preparation of liquid carotenoid dyes which are dispersible in water. The disclosed process includes heating a mixture of polysorbate selected from the group consisting of polysorbate 60 and polysorbate 80, monoglycerides of low molecular weight, saturated coconut acids and saturated fractions of coconut oil triglycerides to a temperature of 100 to 120° C, and then adding the desired carotenoid to the mixture.

Notwithstanding the above techniques for dealing with the pH insensitive colors and the long standing need existing for an acid soluble form of Red No. 3, the prior art has heretofore been unable to solve the problems associated with the use of FD&C Red No. 3 in low pH systems. Since there is no known method of stabilizing Red No. 3 in low pH soluble food systems which are relatively clean and free from precipitation or haze and particularly those derived from dry beverage mixes, it would be highly desirable if a simple method were devised which would allow the use of Red No. 3 in such systems.

SUMMARY OF THE INVENTION

This invention relates to rendering erythrosine soluble and stable in aqueous food system having a pH of less than 4.5 which comprises mixing the erythrosine with an aqueous medium and a hydrophilic surfactant selected from the group consisting of polyoxyethylene (20) sorbitan monostearate, polyoxyethylene (20) sorbitan tristearate and polyoxyethylene (20) sorbitan monooleate. The mixing is performed under conditions of high shear so that a colloidal system is formed.

It is an object of this invention to provide a red food coloring which may be added to an aqueous food system and remain in solution for at least 24 hours when the food system is held at a temperature between about 40° F and about 45° F. It is another object of this invention to provide a red food coloring system which may be used in the formulation of a dry mix which when hydrated under acid conditions is free from haze and/or precipitation of the coloring agent.

DETAILED DESCRIPTION OF THE INVENTION

Figure 1:
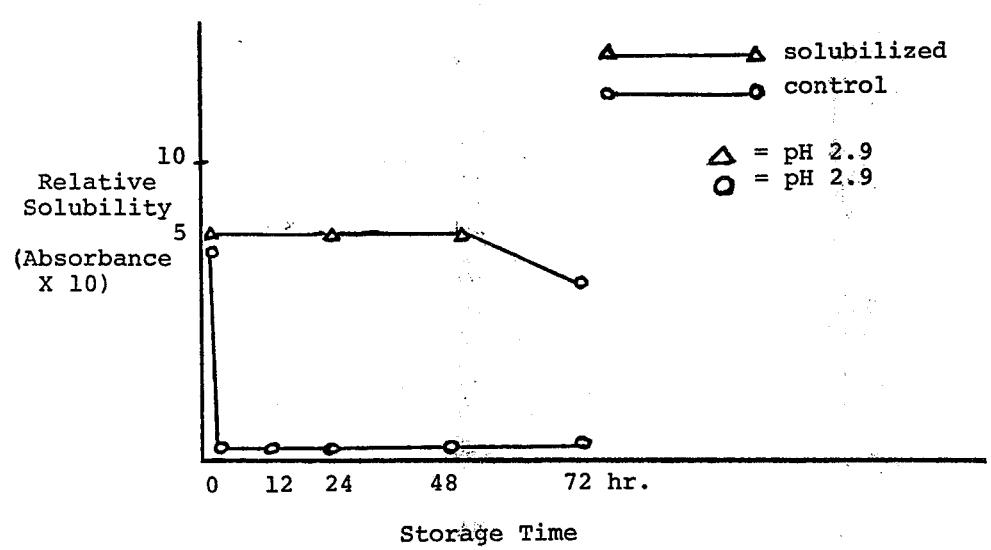
Figure 2:
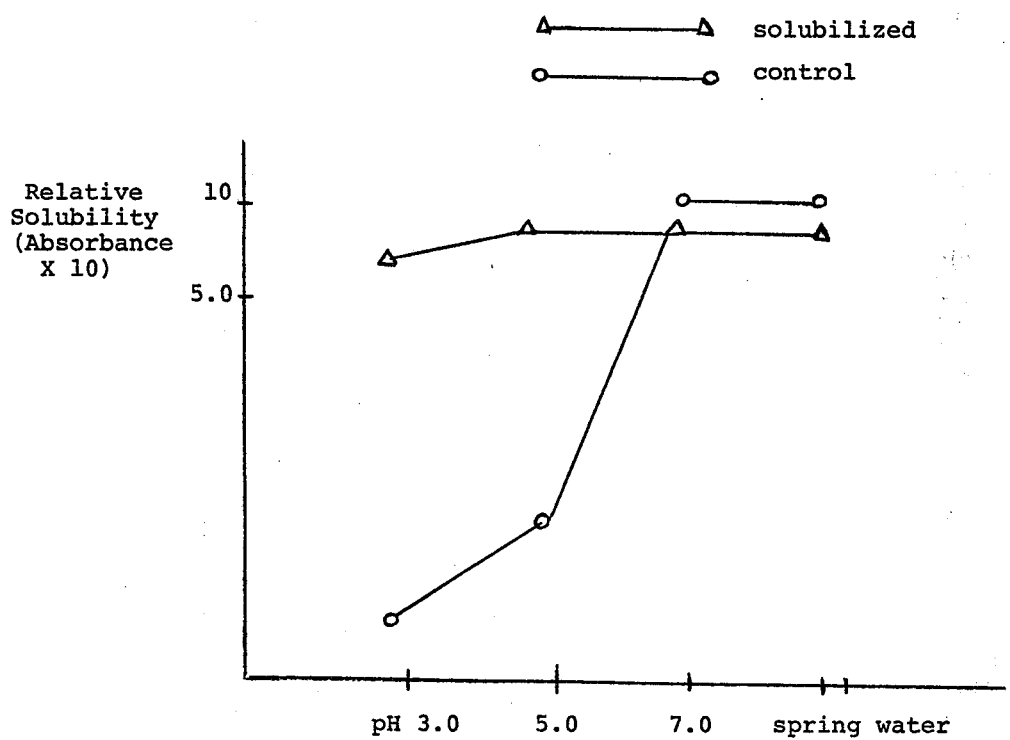

According to the instant invention, Red No. 3 is solubilized by forming a mixture of polysorbate, Red No. 3 color and an aqueous medium under conditions of shear effective to impart the degree of stability necessary for a commercially acceptable aqueous food product. Typically, this is accomplished by using a blender at speeds in excess of 20,000 rpm. The composition of the instant invention forms an optically clear solution when dispersed in water under acid conditions. It is believed that a colloidal suspension is formed. Further, the particle size of the Red No. 3 is believed to be reduced to less than 0.2 microns and that the Red No. 3 is protected from the acid in low pH systems by an encapsulation effect of the polysorbate. In reference to the instant invention, "solubilized" means that the colloidal suspension in the final product is discerned by the eye as a clear solution. Thus, the term "solubilized" in reference to Red No. 3 relates to colloidal dispersions.

The surfactants commonly known as polysorbate 60, polysorbate 65 and polysorbate 80 are the particular polysorbates employed in the practice of this invention. While it is believed that surfactants with an HLB (hydrophilelipophile balance) of between 10 to 17 and preferably 14 to 16 may be operable, factors such as off-flavor, off-color and general unsuitabilty for use in foods make the aforementioned three polysorbates the most desirable choices in the practice of this invention.

Polysorbate 60, polyoxyethylene (20) sorbitan monostearate, is a mixture of stearate and palmitate partial esters of sorbitol and sorbitol anhydrides condensed with approximately 20 moles of ethylene oxide ($C_2H_4O$) for each mole of sorbitol and its mono- and dianhydrides. It is a lemon to orange colored, oily liquid or semi-gel having a faint characteristic odor and a warm, somewhat bitter taste. It is soluble in water, aniline, ethyl acetate, and toluene, but is insoluble in mineral and vegetable oils. Polysorbate 60 is commercially available under the trade name Drewpone 60 from PVO International Inc.

Polysorbate 65, polyoxyethylene (20) sorbitan tristearate, is a mixture of stearate and palmitate partial esters of sorbitol and its anhydrides condensed with approximately 20 moles of ethylene oxide ($C_2H_4O$) for each mole of sorbitol and its mono- and dianhydrides. It is a tan, waxy solid having a faint, characteristic odor and a waxy, somewhat bitter taste. It is soluble in mineral and vegetable oils, mineral spirits, acetone, ether, dioxane and methanol, and is dispersible in water and carbon tetrachloride. Polysorbate 65 is commercially available under the trade name Drewpone 65 from PVO International Inc.

Polysorbate 80, polyoxyethylene (20) sorbitan monooleate, is a mixture of oleate partial esters of sorbitol and sorbitol anhydrides condensed with approximately 20 moles of ethylene oxide ($C_2H_4O$) for each mole of sorbitol and its mono- and dianhydrides. It is a yellow to orange colored, oily liquid having a faint, characteristic odor and a warm, somewhat bitter taste. It is very soluble in water, producing an odorless, nearly colorless solution, and is soluble in ethanol, fixed oils, ethyl acetate and toluene. Polysorbate 80 is commercially available under the trade name Drewpone 80 from PVO International Inc.

When FD&C Red No. 3 is normally added to an aqueous acid food, it immediately begins to precipitate and develop a clouding effect. The product of the instant invention can be mixed in an aqueous low pH system of less than 4.5 and typically less than 4.0 and remain in apparent solution for substantial periods of time. The time duration is effected by temperature. Typically a consumer beverage to be commercially acceptable is refrigerated and in that instance the system retains clarity for periods of at least 24 hours, more preferably clarity will be maintained at temperatures between about 40° F to 45° F. Beverages stored under these conditions will remain useful for periods in excess of 72 hours. At freezer temperatures, i.e., less than 32° F, the product is stable. Additionally, the product may be subjected to multiple freezing and thawing cycles without adverse effect as long as the beverage is mixed after thawing. At room (about 70° F) temperature the aqueous acidic foods colored in accordance with this invention are stable for periods of at least 12 hours.

According to one embodiment of this invention, solubilized Red No. 3 in any of the identified polysorbates may be used as a liquid directly in a beverage or an aqueous food system. The Red No. 3 is first solubilized by mixing it under high shear conditions with a combination of polysorbate and water or polysorbate and a portion of the aqueous food system or mixing the Red 3 and polysorbate with the entire aqueous food system to be colored. It has been found that the ratio of water to polysorbate must be at least 5:1. The ratio of water to polysorbate may range from 5:1 to 100:1. Preferably to form the initial solution, the ratio of water to polysorbate will be between 1:1 to 5:1. The preferred range will produce a solution which may be added directly to an aqueous food system. However, it is within the scope of this invention that ratios of water to polysorbate in excess of 100:1 may be employed typically when the aqueous food system itself is used to form the initial solution.

Another embodiment of this invention relates to the use of solubilized Red No. 3 in a dry food system which may be subsequently reconstituted. This is accomplished by first preparing a solution as above, preferably using water to form the aqueous phase, although again a portion of the final aqueous food system may be used in place of water. It is preferable to use a minimum amount of water to form the solution since excess water will simply require longer drying time and the process will be energy intensive to produce a dry form of solubilized Red No. 3. Once the solution is obtained, it is next combined with a carrier and dried. The carriers employed may be any of those non-toxic edible systems or combination of substances known to the art for use in foods of the type described herein. These include tricalcium phosphate, hydrophilic colloids such as dextrins and gum Arabic, and the organic acids such as citric, adipic, fumaric, tartaric, and malic acids. Preferably the carrier will be a dextrin. The dextrin must dissolve easily in water to provide a clear solution and must be non-hydroscopic. In this regard the D.E. (dextrose equivalent) of the dextrin material has been found to be an important parameter. The dextrin material must have a sufficiently low molecular weight to be easily soluble in water. On the other hand, the molecular weight of the dextrin materials should be high enough so that hydroscopicity is avoided.

The more suitable dextrins will have a D.E. in the range of about 4 to 40 and preferably in the range of about 5 to 20. It has been found that best results are obtained if the dextrin material contains little or no monosaccharide (i.e. glucose) and contains an irregular distribution of the lower (1 to 8 saccharide units) saccharides with a preponderance of the hexamer and heptamer. These corn syrup dextrins can be produced by known means such as enzymatic hydrolysis of starch. Suitable commercially available dextrins include those sold under the trademarks Mor Rex and Frodex.

In order to dry the solubilized Red No. 3 with the carrier, an amount of water is added to the carrier to put it in solution. Again, a portion of the final aqueous food system may be used to solubilize the carrier. Next, the solubilized Red No. 3 is mixed with the solubilized carrier under high shear conditions. Alternatively, the Red No. 3/polysorbate and carrier may be mixed with water in a single step. Thus, it is not necessary to separately put the carrier into solution. Additionally, the solubilized carrier must be added to the Red No. 3/polysorbate without additional high shear mixing if sufficient water is used and the carrier is highly soluble in the water.

In the mix obtained, the Red No. 3 is believed to be encapsulated in the polysorbate and is thus protected from the acid in low pH aqueous food systems. Next the entire mix may be dried by any conventional means. Preferably spray drying will be employed since this method permits rapid removal of large volumes of water. Other methods such as drum drying, vacuum drum drying or freeze drying may also be employed. The moisture of the final product may range from about 1% to about 5% by weight of the total composition.

It has been found that the ratio of color to surfactant may be between 1:7 to 1:15. Preferably the ratio of color to surfactant is 1:9. The ratio of color to surfactant also varies the final color of the product so that in the range of 1:7 the product has a red color, at 1:9 the product has a blue/red appearance and at 1:15 and above the product has a purple/red appearance. Excessive use of polysorbate in the product, typically any ratios of color to polysorbate or in excess of 1:15 may result in an off-color imparted by the polysorbate in the product. The amount of carrier used in relation to color and polysorbate employed to obtain a dry mix will vary according to the particular carrier used. For example, when a dextrin is used as a carrier, the ratio of Red No. 3/polysorbate to dextrin may be 1:1 to 1:50. Additionally, the amount of water in relation to dextrin should be at least the minimum to dissolve the particular dextrin selected. Water in excess of such a minimum may be used; however, this will increase the drying time. Relatively large amounts of dextrin are tolerable in the dry mix since they dissolve in the final aqueous food system and generally impart some sweetness to the product. When an acid is used as a carrier, the ratio of Red No. 3/polysorbate to acid generally does not exceed 1:10 although such a ratio is only a guideline and not considered limiting. The use of a large amount of acid carrier will produce a final beverage which may be too tart. Generally it will be noted that using a minimum amount of carrier to accomplish the drying process results in a relatively more concentrated color.

Typically, an anti-oxidant will be added to the dried product in an amount effective to prevent rancidity which will result in an off flavor. Butylated hydroxy anisole (BHA) and butylated hydroxy toluene (BHT) are commonly employed as anti-oxidants. The level in the spray dried material is typically between about 0.25% to about 0.5% by weight of the dried product. Additionally, polysorbates may contain up to about 0.25% anti-oxidant material in addition to that which is added after spray drying.

An edible food acid selected from the group consisting of citric, malic, fumaric, adipic, tartaric, phosphoric and mixtures thereof is added to the aqueous food or dry mix to produce a beverage with a pH of between 2.0 to 4.4, usually below pH 3.5 and preferably between 2.6 and 3.0. Additional ingredients such as vitamins, flow agents, clouding agents, etc., may be included in the food system as in U.S. Pat. Nos. 3,968,263, 3,975,547, 4,001,448 and 4,002,770 which are herein incorporated by reference.

It is intended that the colorant produced according to the instant invention may be used by itself or in combination with other known colorants. Additionally, natural or artifical colors which are water soluble in acidic mediums may be used in various combinations with the instant colorant. Exact replacement ratios or amounts needed to enhance the various colorants with the product of the instant invention will be readily apparent to those skilled in the art. Preferably, the amount of food coloring contained in the final aqueous food system will be between about 30 parts per million and 400 parts per million. Most preferably, the amount of color will be between 50 parts per million and 300 parts per million in relation to the total composition of the final food product to be colored.

The instant invention is applicable to final products such as beverages, carbonated beverages, gelatin desserts, puddings, as well as sauces and toppings.

The following Examples are presented for the purpose of further describing the present invention and are not to be taken as limiting in any regard. Unless otherwise indicated, all references to proportions or amounts refer to parts by weight.

EXAMPLE I

A. This example illustrates the stability of solubilized Red No. 3 compared to a control in reconstituted dry beverages stored at 43° F at a pH of 2.9.

$\Delta$ = a beverage formulated from a dry mix as follows:

| | |
|---|---|
| Sugar | 96.510% |
| Food Acid | 1.720% |
| Buffer | 1.430% |
| Flavor | .080% |
| Solubilized Red #3 | .260% |
| | 100.000% |

The solubilized Red No. 3 is obtained by combining one part FD&C Red No. 3, nine parts polysorbate 80, 25 parts Mor Rex$^{(TM)}$ dextrin having a D.E. of 15 and 100 parts water in an Eppenbach mixer operated at 30,000 RPM for fifteen minutes. The resulting emulsion is spray-dried in laboratory Niro spray dryer.

0 = control utilizing Red No. 3 jet-milled in a Micromaster$^{(TM)}$ jet mill to average particle size of two microns formulated from a dry beverage mix as follows:

| | |
|---|---|
| Sugar | 96.756% |
| Food Acid | 1.722% |
| Buffer | 1.432% |
| Flavor | .082% |
| Jet-milled Red #3 | .008% |
| | 100.000% |

The following spectrophotometric results depict the relative stability of the dry mixes reconstituted at a ratio of ten parts water to one part mix where the resulting beverage is stored at 43° F. A Carey 14 Spectrophotometer is employed to measure the relative solubility. The absorbance meter scale of 0–2 is multiplied by a factor of ten to obtain relative whole numbers.

B. The drawings represents a spectrophotometric comparison of beverages formulated as in part A of this example except that the amounts of acid and buffer are varied to obtain the appropriate pH values as indicated in the drawings.

Δ = solubilized Red No. 3

0 = control (Jet-milled Red No. 3)

All readings taken within five minutes of water addition to the beverage mixes.

EXAMPLE II

A mix consisting of one part FD&C Red No. 3, nine parts of polysorbate 80, 100 parts of water, and 25 parts of Mor Rex$^{(TM)}$ dextrin having a D. E. of 15 is prepared in an Eppenbach mixer by operating the mixer at 30,000 RPM for fifteen minutes. The solution obtained is spray-dried in a Niro laboratory spray dryer. The average inlet temperature of the dryer is 150° C and the average outlet temperature of the spray dryer is 90° C. The resulting products have a moisture content of less than 5% by weight of the total composition and has a bluish/red appearance.

Next, a dry beverage mix is formulated from the ingredients comprising 95.50% sugar, 1.85% citric acid, 1.55% monocalcium phosphate, 0.04% Vitamin C, 0.03% strawberry flavor, and 0.3% of the above spray-dried product.

Extended storage stability tests of the dry mix, i.e., 90 days at a temperature of 100° F and 55% relative humidity had no deleterious effects on final product color. The dry beverage mix, whether hydrated with water prior to storage or after 90 days storage, produces a clear beverage which is free from haze and/or precipitation for a period in excess of 48 hours when stored at a refrigerator temperature of 43° F.

EXAMPLE III

A spray-dried product is prepared according to Example II, except that 7 parts of polysorbate 80 is employed for each one part of FD&C Red No. 3. An unsweetened dry beverage mix is formulated consisting of 49.8% citric acid, 41.08% monocalcium phosphate, 1.18% Vitamin C and 0.75% cherry flavor.

Extended storage stability tests of the dry mix, i.e., 90 days at a temperature of 100° F and 55% relative humidity had no deleterious effects on final product color.

The dry beverage mix, when hydrated with water prior to storage and when hydrated after 90 days storage, produces a clear beverage which is free from haze and/or precipitation for a period in excess of 48 hours when stored at a refrigerator temperature of 43° F.

EXAMPLE IV

A mix consisting of one part FD&C Red No. 3, nine parts polysorbate 60, 100 parts water, and 25 parts Mor Rex$^{(TM)}$ dextrin having a D.E. of 15 is prepared in an Eppenbach mixer operated at 30,000 RPM for fifteen minutes. The resulting solution is freeze-dried in a Thermovac$^{(TM)}$ vacuum chamber. The shelf temperature is maintained at 90° F and the pressure is maintained at 200 microns of mercury for 24 hours. The resulting product has a moisture content of less than 5% by weight of the total composition.

A dry beverage mix is formulated comprising 95.50% sugar, 1.85% citric acid, 1.55% mono-calcium phosphate, 0.04% Vitamin C, 0.03% grape flavor and 0.3% of the above freeze-dried color.

Extended storage stability tests of the dry mix, i.e., 90 days at a temperature of 100° F and 55% relative humidity had no deleterious effects on final product color. The dry beverage mix, when hydrated with water either prior to or after 90 days storage, produces a clear beverage which is free from haze and/or precipitation for a period in excess of 48 hours when stored at a refrigerator temperature of 43° F.

When carriers such as Frodex$^{(TM)}$ and other dextrins as well as acids such as citric, adipic, malic, tartaric, and furmaric may be substituted for the Mor Rex$^{(TM)}$ in art recognized proportions, similar results are obtained.

We claim:

1. A process of rendering erythrosine soluble and stable in an aqueous food substance having a pH of less than 4.5 which comprises combining erythrosine, an aqueous medium and a hydrophilic surfactant selected from the group consisting of polyoxyethylene (20) sorbitan monostearate, polyoxyethylene (20) sorbitan tristearate and polyoxyethylene (20) sorbitan monooleate and mixtures thereof, under conditions of shear effective to form a colloidal system and to render the erythrosine soluble in said food substance for at least 24 hours when the food substance is held at a temperature between about 40° F and about 45° F, the ratio of aqueous medium to surfactant being sufficient to produce said colloidal system.

2. The process of claim 1 wherein the ratio of erythrosine to surfactant is between 1:7 to 1:15.

3. The process of claim 1 wherein the ratio of erythrosine to surfactant is 1:9.

4. The process of claim 1 wherein the hydrophilic surfactant comprises polyoxyethylene (20) sorbitan monostearate.

5. The process of claim 1 wherein the hydrophilic surfactant comprises polyoxyethylene (20) sorbitan tristearate.

6. The process of claim 1 wherein the hydrophilic surfactant comprises polyoxyethylene (20) sorbitan monooleate.

7. The process of claim 1 wherein the solubilized erythrosine is combined with a carrier.

8. The process of claim 7 wherein the erythrosine is combined with a carrier in aqueous medium and the mixture is dried.

9. The process of claim 8 wherein the mixture is freeze dried.

10. The process of claim 8 wherein the mixture is drum dried.

11. The process of claim 8 wherein the mixture is vacuum drum dried.

12. The method of claim 1 wherein the ratio of the aqueous medium to the hydrophille surfactant is between about .5:1 to about 100:1.

13. The process of claim 1 wherein the ratio of the aqueous medium to the hydrophille surfactant is between about 1:1 to about 5:1.

14. A dry beverage mix comprising flavor, erythrosine color prepared according to the process of claim 1, said solubilized erythrosine being combined with a carried then dried, and an amount of edible acid effective to provide a beverage with a pH between about 2.0 to about 4.4.

15. The product of claim 14 wherein the amount of erythrosine in the dry mix is sufficient to provide between about 30 parts per million to about 400 parts per million of color in the beverage.

16. The product of claim 14 wherein the solubilized erythrosine is co-dried with the carrier selected from the group consisting of tricalcium phosphate, gum Arabic, dextrins with a DE from 4 to 40, citric acid, adipic acid, fumaric acid malic acid, tartaric acid, phosphoric acid and mixtures thereof.

17. The product of claim 14 wherein the ratio of erthrosine to surfactant is 1:7 to 1:15.

18. The product of claim 14 wherein the ratio of erthrosine to surfactant is 1:9.

19. The product of claim 14 wherein the hydrophilic surfactant comprises polyoxyethylene (20) sorbitan monostearate.

20. The product of claim 14 wherein the hydrophilic surfactant comprises polyoxyethylene (20) sorbitan tristearate.

21. The product of claim 14 wherein the hydrophilic surfactant comprises polyoxyethylene (20) sorbitan monooleate.

22. The product of claim 14 wherein the edible acid provides a pH of between 2.7 to 3.1.

23. The product of claim 14 wherein the drying comprises spray drying.

24. The product of claim 14 wherein the drying comprises freeze drying.

25. The product of claim 14 wherein the drying comprises drum drying.

26. The product of claim 14 wherein the drying comprises vacuum drum drying.

27. The process of claim 8 wherein the mixture is spray dried.

* * * * *